United States Patent [19]

Nielinger et al.

[11] Patent Number: 4,762,910
[45] Date of Patent: Aug. 9, 1988

[54] PROCESS FOR THE PREPARATION OF COPOLYAMIDE FROM ADIPIC ACID, TEREPHTHALIC ACID AND HEXAMETHYLENE DIAMINE

[75] Inventors: Werner Nielinger; Wolfgang Alewelt; Rudolf Binsack; Ludwig Bottenbruch, all of Krefeld; Heinz-Josef Füllmann, Leverkusen, all of Fed. Rep. of Germany

[73] Assignee: Bayer Aktiengesellschaft, Leverkusen, Fed. Rep. of Germany

[21] Appl. No.: 897,384

[22] Filed: Aug. 18, 1986

Related U.S. Application Data

[63] Continuation of Ser. No. 705,625, Feb. 26, 1985, abandoned.

[30] Foreign Application Priority Data

Mar. 1, 1984 [DE] Fed. Rep. of Germany ....... 3407492

[51] Int. Cl.[4] ............................................ C08G 69/28
[52] U.S. Cl. .................... 528/339; 528/335; 528/336; 528/347
[58] Field of Search ................ 528/339, 335, 336, 347

[56] References Cited

U.S. PATENT DOCUMENTS

| | | | |
|---|---|---|---|
| 3,383,369 | 5/1968 | Ridgway | 528/339 |
| 3,388,099 | 6/1968 | Ridgway | 528/339 |
| 3,402,152 | 9/1968 | Brignac et al. | 260/78 |
| 3,475,387 | 10/1969 | Carter et al. | 528/339 |
| 3,501,441 | 3/1970 | Brignac et al. | 260/78 |
| 3,654,236 | 4/1972 | Ridgway | 528/339 |
| 4,218,509 | 8/1980 | Edgar et al. | 528/339 |
| 4,603,166 | 7/1986 | Poppe et al. | 528/339 |

FOREIGN PATENT DOCUMENTS 0121984 2/1984 European Pat. Off. .

*Primary Examiner*—Harold D. Anderson
*Attorney, Agent, or Firm*—Connolly and Hutz

[57] ABSTRACT

Process for the preparation of copolyamides from adipic acid, terephthalic acid and hexamethylene diamine containing 25–48% by weight of units of hexamethylene terephthalamide, by precondensing the monomers at a temperature of at least 250° C. and a pressure of at least 35 bar and completing the polycondensation in the usual manner.

6 Claims, No Drawings

PROCESS FOR THE PREPARATION OF COPOLYAMIDE FROM ADIPIC ACID, TEREPHTHALIC ACID AND HEXAMETHYLENE DIAMINE

This is a continuation of application Ser. No. 705,625 filed Feb. 26, 1986, abandoned.

This invention relates to a process for the preparation of copolyamides from adipic acid, terephthalic acid and hexamethylene diamine containing 25 to 48% by weight of units of hexamethylene terephthalamide by precondensing the monomers at a temperature of at least 250° C. and a pressure of at least 35 bar and then completing the polycondensation in the usual manner.

Polyamides such as polyamide-6 and polyamide-66 are distinguished by their great hardness, rigidity and dimensional stability under heat. They are abrasion- and wear-resistant and resistant to numerous chemicals. These polyamides are therefore widely used for the production of technical moulded parts as, for example, in the motor car industry.

For the numerous purposes of application, however, it is necessary to expose the moulded parts to elevated temperatures. This applies particularly to reinforced products. Certain copolyamides of adipic acid, terephthalic acid and hexamethylene diamine meet this requirement. Their preparation is described in DE-PS No. 929,151 and their use for the production of films is described in European Patent Application No. 34 757 while their use as glass fibre-reinforced material for the extrusion of profiles is disclosed in German Offenlegungsschrift No. 2,927,018. According to British Pat. No. 1,114,541, the softening point of copolyamides containing more than 18% by weight of poly-(hexamethylene terephthalamide) rises above 265° C. while DP No. 929,151 gives a melting point of 249° C. for copolyamides containing 20% by weight of poly(hexamethylene terephthalamide). DOS No. 1,669,453 desribes polyamides of adipic acid, terephthalic acid and hexamethylene diamine which may be used as nucleating agents for polyamide fibres. These copolyamides, however, are unsuitable for use as injection moulding material owing to their high melting points. In DOS No. 1,745,076, the addition of sulphonamides before or during polycondensation is recommended to facilitate the preparation of copolyamides from adipic acid, terephthalic acid and hexamethylene diamine.

Particularly suitable copolyamides are those containing more than 35% by weight of poly(hexamethylene terephthalamide) since their melting temperature is considerably higher than that of poly(hexamethylene adipamide) and their freezing temperature is above 75° C. These copolyamides prepared according to the state of the art, however, vary in their properties so that reproducible products cannot be obtained by the known processes, especially if, according to the known teaching in the art, precondensation is carried out at temperature in the region of 220° C. and long heating-up periods are required, as for example in the preparation of these products in autoclaves. Thus, copolyamides having a given overall composition may not only differ by more than 10° C. in their melting point but also by more than 5° C. in their freezing temperature, depending upon the conditions under which they were prepared. Moreover, copolyamides prepared according to the state of the art are not completely soluble in formic acid. The insoluble portions impair the strength and toughness of the copolyamide since they are liable to cause cracks when the products are subjected to impacts.

It has now surprisingly been found that copolyamides of adipic acid, terephthalic acid and hexamethylene diamine with relatively high terephthalic acid contents may be obtained with improved properties by very rapidly heating the aqueous solution of the monomers for precondensation to a temperature of at least 250° C., preferably at least 260° C., and then completing the condensation of the resulting precondensate to the desired molecular weight by known methods.

The present invention thus relates to a process for the preparation of homogeneous polyamides of adipic acid, terephthalic acid and hexamethylene diamine containing from 25 to 48% by weight, preferably from 30 to 45% by weight, of hexamethylene terephthalamide units, which polyamides are completely soluble in formic acid, wherein a 40 to 70% by weight aqueous solution, preferably a 45 to 65% solution, of the monomers is heated to at least 250° C., preferably 260° to 300° C., in less than 15 minutes, preferably within 1 to 10 minutes, at a pressure of at least 35 bar, and the water is distilled off at a temperature of from 260° and to 300° C. at a pressure of 1 to 40 bar, preferably 1–35 bar, in one or more stages until a precondensate having a relative viscosity of from 1.5 to 2,4, preferably from 1.8 to 2.3 is obtained, and the precondensate obtained at normal pressure is after-condensed in known manner.

The after-condensation may be carried out in the solid phase after the precondensate has solidified. An apparatus as described in U.S. Pat. No. 2,361,717, FIG. I, for example, may be used for preparing the copolyamide.

Copolyamides which have been prepared by the process according to the invention are completely soluble in formic acid. Compared with products prepared by the known processes they have a higher glass transition temperature, reduced water absorption and improved toughness. They may be worked up on conventional commercial machines such as injection moulding machines or extruders.

The usual additives and auxiliary agents such as lubricants and mould release agents, stabilizers, fibre retarding agents and fillers, especially glass fibres in quantities of 10 to 60% by weight, based on the total mixture, may be added to the copolyamides prepared according to the invention. Other fillers and reinforcing materials which may be used include microglass beads, chalk, various quartzes such as, for example, novaculite, silicates such as asbestos, feldspar, mica, talcum or wollastonite, or kaolin, either in a calcined or in a non-calcined form. Dyes and pigments may also be used, in particular carbon black dyes and/or nigrosine bases, as well as impact strength modifiers, for example those based on copolymers of ethylene, poly(meth)acrylates and grafted polybutadienes.

The copolyamides are particularly suitable for the production of various types of moulded products such as injection moulded parts, plates, films and fibres. They are used in particular for the manufacture of parts of machinery an technical apparatus and in the construction of motor vehicles. The electrical sector is another field of application.

The relative viscosities are determined in a 1% by weight solution of the polyamide in m-cresol at 25° C. Parts and percentages in the following examples are all by weight.

EXAMPLE 1

Continuous preparation of the copolyamide may be carried out, for example, in the apparatus described in U.S. Pat. No. 2,361,717, FIG. I.

A 50% aqueous salt solution containing 11.7 parts of terephthalic acid, 16.8 parts of adipic acid and 21.5 parts of hexamethylene diamine (corresponding to 40% by weight polyamide 6T content, based on the copolyamide) is pumped at pressure of 70 bar from a receiver heated to 80° C. through a coil 6 meters in length and 10 mm in diameter which is heated with oil to 280° C. The rate of throughput of the salt solution is 3,000 g/h. The reaction mixture is then released through a pressure release valve into a second coil heated to 290° C., which has a length of 12 m and a diameter of 10 mm. This second coil ends in a cylindrical container heated to 280° C., in which the polyamide melt separates from the steam. The steam is discharged from the cylindrical container through a second release valve and condensed. The pressure in the second coil and in the cylindrical container is adjusted to 30 bar. The polyamide melt is transferred by a gear wheel pump into a short screw with exhaust openings for evaporation, and is further condensed therein. The polyamide melt is then spun off, cooled in a water bath and granulated. The granulate has a relative viscosity of 2.1, determined on a 1% solution in m-cresol at 25° C. in an Ubbelohde viscosimeter. This low molecular weight polyamide granulate is after-condensed batch-wise in the solid phase in a tumbler drier for 8 hours at 200° C. in a stream of nitrogen until the desired end viscosity of 3 is obtained.

The residence time of the reaction mixture in the first coil is about 9.5 minutes, the mixture being heated to a temperature of 280° C. after about 3 minutes. After the first release of pressure, the temperature briefly drops to 250° C. In the second coil, the mixture is heated to 290° C. and, after an average residence time of about 10 minutes in the coil including the vapour separator, the material is condensed to a polyamide with relative viscosity 2.1 within about 5 minutes in the screw.

EXAMPLE 2

A low viscosity polyamide having a solution viscosity of 2.3 is produced by the process described in Example 1 from an aqueous salt solution of 9.7 parts of terephthalic acid, 18.8 parts of adipic acid, 21.6 parts of hexamethylene diamine and 50 parts of water, corresponding to 33% by weight of poly(hexamethylene diaminoterephthalamide). After-condensation in the solid phase yields a copolyamide having the desired relative viscosity of 2.9 after 6 hours at 200° C. in a stream of nitrogen.

EXAMPLE 3

A low viscosity polyamide having a relative viscosity of 1.9 is produced by the process described in Example 1 from an aqueous salt solution of 14.1 parts of terephthalic acid, 14.6 parts of adipic acid, 21.4 parts of hexamethylene diamine and 50 parts of water, corresponding to 48% by weight of poly(hexamethylene diamineterephthalamide). After-condensation in the solid phase yields a copolyamide with the desired relative viscosity of 3.0 after 12 hours at 200° C. in a stream of nitrogen.

COMPARISON EXAMPLE 1

Batch-wise preparation of a copolyamide of adipic acid, terephthalic acid and hexamethylene diamine containing 40% by weight of hexamethylene terephthalamide units.

(a) Preparation of the salt solution. 3975 g of an 80% aqueous hexamethylene diamine solution (27.37 mol hexamethylene diamine) are slowly added to 90° to 95° C., with stirring under a nitrogen atmosphere, to a suspension of 1727 g (10.39 mol) of terephthalic acid in 4329 g of distilled water, and 2480 g (16.96 mol) of adipic acid are then added to the clear solution obtained. This solution is adjusted to a pH of 7.0, the pH being measured after dilution to a solids content of 5%.

After the addition of a further 30 g of adipic acid to limit the molecular weight, the approximately 56% solution is introduced into an autoclave.

(b) Polycondensation of the salt solution. The salt solution is heated to 210° C. in the autoclave within 50 minutes with stirring under a nitrogen atmosphere, the pressure adjusting to 20 bar in the process. The temperature is raised to 260° C. in the course of 2 hours while the pressure is kept constant by release of pressure. The pressure is subsequently completely released within 2 hours while the temperature is raised to 285°-290° C. After a further hour, the copolyamide is spun off, cooled in a water bath, and granulated and dried. The relative viscosity of the product is 3.1.

The copolyamides containing 40% by weight of polyamide 6T produced continuously in Example 1 and batch-wise in comparison Example 1 have the following characteristic features.

| Polyamide according to | Example 1 | Comparison Example 1 |
| --- | --- | --- |
| Relative viscosity | 3.0 | 3.1 |
| Melt maximum DTA 2nd heating | 287° C. | 276° C. |
| Solubility in formic acid | soluble | not completely soluble |
| Impact strength DIN 53453 | no breakage | several breakages. |

We claim:

1. A process for the preparation of a copolyamide condensate containing 25 to 48% by weight of units of hexamethylene terephthalamide which comprises heating a 40 to 70% by weight aqueous solution of adipic acid, terephthalic acid and hexamethylene diamine, to at least 250° C. under a pressure of at least 35 bar in less than 15 minutes and then distilling off water at a temperature of 260°-300° C. at a pressure of 1-40 bar in one or more stages, whereby a precondensate having a relative visocsity of 1.5-2.4, as measured in a 1% by weight m-cresol solution at 25° C., is obtained which is thereafter condensed to produce the copolyamide condensate.

2. A process according to claim 1, in which a 45 to 65% by weight aqueous solution of the monomers is used.

3. A process according to claim 1 or 2, in which the aqueous solution of the monomers is heated to 260° to 300° C.

4. A process according to claims 1 or 2, in which the heating of the aqueous solution of the monomers is carried out in 1 to 10 minutes.

5. A process according to claims 1 or 2, in which the precondensate formed has a relative viscosity of from 1.8 to 2.3.

6. A copolyamide condensate completely soluble in formic acid containing 25 to 48% by weight of polymerized hexamethylene terephthalamide units produced by a process wherein a reaction mixture consisting of adipic acid, terephthalic acid and hexamethylene diamine in a 40 to 60% aqueous solution is heated to at least 250° C. under a pressure of at least 35 bar in less than 15 minutes and then water is distilled off at a temperature of 260° to 300° C. at a pressure of 1–40 bar in one or more stages to obtain a precondensate having a relative viscosity of 1.5–2.4, as measured in a 1% by weight m-cresol solution at 25° C., which is thereafter condensed to produce the copolyamide condensate.

* * * * *